United States Patent
Li et al.

(10) Patent No.: US 10,960,815 B2
(45) Date of Patent: Mar. 30, 2021

(54) METHOD FOR CONTROLLING THE AUTOMATIC DISPLAY OF A PICTOGRAM REPRESENTATIVE OF THE PRESENCE OF A DISRUPTION IN FRONT OF THE VEHICLE

(71) Applicant: VALEO VISION, Bobigny (FR)

(72) Inventors: Joel Li, Bobigny (FR); Kedar Sathaye, Bobigny (FR)

(73) Assignee: VALEO VISION, Bobigny (FR)

( * ) Notice: Subject to any disclaimer, the term of this patent is extended or adjusted under 35 U.S.C. 154(b) by 219 days.

(21) Appl. No.: 16/091,402

(22) PCT Filed: Apr. 5, 2017

(86) PCT No.: PCT/EP2017/058147
§ 371 (c)(1),
(2) Date: Oct. 4, 2018

(87) PCT Pub. No.: WO2017/174674
PCT Pub. Date: Oct. 12, 2017

(65) Prior Publication Data
US 2019/0126816 A1    May 2, 2019

(30) Foreign Application Priority Data

Apr. 5, 2016  (FR) ....................... 1652986

(51) Int. Cl.
*B60Q 1/52* (2006.01)
*B60Q 1/50* (2006.01)
(Continued)

(52) U.S. Cl.
CPC ............. *B60Q 1/525* (2013.01); *B60Q 1/46* (2013.01); *B60Q 1/503* (2013.01); *B60T 7/12* (2013.01); *G06K 9/00818* (2013.01)

(58) Field of Classification Search
None
See application file for complete search history.

(56) References Cited

U.S. PATENT DOCUMENTS 6,327,522 B1 * 12/2001 Kojima ................. B60K 35/00
                                                    701/1
8,077,921 B2 * 12/2011 Kawasaki .......... G06K 9/00825
                                                    340/907
(Continued)

FOREIGN PATENT DOCUMENTS

DE   10 2014 206 575 A1   7/2015
EP       1 728 681 A1    12/2006
(Continued)

OTHER PUBLICATIONS

International Search Report dated Jul. 18, 2017, in PCT/EP2017/058147 filed Apr. 5, 2017.

*Primary Examiner* — Redhwan K Mawari
*Assistant Examiner* — Melanie J Patrick
(74) *Attorney, Agent, or Firm* — Oblon, McClelland, Maier & Neustadt, L.L.P.

(57) ABSTRACT

A method for controlling a display means on board a motor vehicle, characterized in that it includes: a first step of determining the presence of a disruption in front of the vehicle, in which it is checked that at least one parameter representative of the presence of a disruption in front of the vehicle meets at least one predetermined condition; a second step of developing a display order that is triggered when the predetermined conditions are met, and in which an order to display a pictogram representative of the disruption on the display means is transmitted by an electronic control unit.

20 Claims, 4 Drawing Sheets

(51) Int. Cl.
*B60Q 1/46* (2006.01)
*B60T 7/12* (2006.01)
*G06K 9/00* (2006.01)

(56) References Cited

U.S. PATENT DOCUMENTS

| | | |
|---|---|---|
| 8,954,252 B1 | 2/2015 | Urmson et al. |
| 9,196,164 B1 | 11/2015 | Urmson et al. |
| 2015/0002620 A1* | 1/2015 | Shin .................... B60W 30/095 348/36 |
| 2015/0179063 A1 | 6/2015 | Aziz et al. |
| 2015/0194082 A1 | 7/2015 | Mcewan |
| 2015/0197188 A1 | 7/2015 | Ichino |
| 2017/0101147 A1* | 4/2017 | Hasegawa ................... B62J 6/04 |
| 2017/0240096 A1* | 8/2017 | Ross .................... G08G 1/0955 |

FOREIGN PATENT DOCUMENTS

| | | |
|---|---|---|
| FR | 2 958 894 A1 | 10/2011 |
| FR | 2 992 743 A1 | 1/2014 |

\* cited by examiner

METHOD FOR CONTROLLING THE AUTOMATIC DISPLAY OF A PICTOGRAM REPRESENTATIVE OF THE PRESENCE OF A DISRUPTION IN FRONT OF THE VEHICLE

TECHNICAL FIELD OF THE INVENTION

The invention relates to a method for controlling a display means on board a motor vehicle, the display means including a display area visible from outside the vehicle, the display means being configured to selectively display each of the pictograms from a list of a plurality of predetermined pictograms, each predetermined pictogram being representative of a determined situation.

TECHNICAL BACKGROUND OF THE INVENTION

Vehicles on the road may stop, or at least slow down substantially, for various reasons including the observation of regulatory signage, for example a stop sign or a red light, or else the presence of a disruption in front of the vehicle.

The disruption in front of the vehicle may be formed by:
  road users crossing the road, such as pedestrians, cyclists, other motor vehicles or animals;
  the presence of an obstruction on the road;
  the presence of weather conditions substantially reducing visibility for the driver, such as fog or heavy rain.

Regulatory signs are generally arranged so as to be sufficiently visible on the roads that they can be seen from following vehicles when a first vehicle stops.

However, in the case of a disruption in front of the vehicle, it can happen that the first slowing or stopping vehicle masks the presence of the disruption from the drivers of following vehicles. In some cases, the following drivers may be tempted to overtake the vehicle that is slowing or stopping, unaware of the presence of the disruption. Such a situation is therefore particularly dangerous.

BRIEF SUMMARY OF THE INVENTION

The invention provides a method that makes it possible to warn the following drivers of the presence of a disruption in front of the vehicle. To this end, the invention thus provides a control method of the type described above, characterized in that the method includes:
  a first step of determining the presence of a disruption in front of the vehicle, in which it is checked that at least one parameter representative of the presence of a disruption in front of the vehicle meets at least one predetermined condition;
  a second step of developing a display order that is triggered when the predetermined conditions are met, and in which an order to display a pictogram representative of said disruption in front of the vehicle on the display means is transmitted by an electronic control unit.

According to other features of the invention:
  a first parameter representative of the presence of a disruption in front of the vehicle is formed by the speed of the vehicle, the associated condition to be met in the first step being that the driving speed of the vehicle is below a predetermined threshold;
  a second parameter representative of the presence of a disruption in front of the vehicle is formed by the actuation state of a command to brake the vehicle, the associated condition to be met in the first step being that the brake command is actuated beyond a predetermined degree;
  the vehicle is fitted with at least one remote detection device that is capable of detecting the presence of an obstacle in front of the vehicle, a second condition for the presence of a road user being that an obstacle appears in front of the vehicle at a distance that is below a predetermined distance;
  the vehicle is fitted with at least one remote detection device that is capable of detecting the presence of a moving obstacle in front of the vehicle, a third condition being that an obstacle moving transversely with respect to the longitudinal direction of movement of the vehicle is detected in front of the vehicle;
  a parameter representative of the presence of a disruption in front of the vehicle is formed by the detection of an obstacle in front of the vehicle by at least one front remote detection device, a condition for the presence of an obstacle is that an obstacle is detected in the path of the vehicle at a distance that is greater than a predetermined distance, and that the separation from the obstacle decreases below a predetermined value in front of the vehicle;
  the vehicle is fitted with at least one remote detection device that is capable of detecting the presence of a road user behind the vehicle, a condition for displaying the pictogram being that a following vehicle is detected at a distance that is below a predetermined value behind the vehicle;
  the remote detection device includes at least one emitter of an electromagnetic signal and an associated sensor for receiving said electromagnetic signal after reflection off an obstacle located in front of the vehicle, such as a lidar;
  the remote detection device includes at least one emitter of a sound signal, in particular ultrasound, and an associated sensor for receiving said sound signal after reflection off an obstacle;
  the remote detection device is formed by at least one proximity sensor;
  the remote detection device includes a camera that is suitable for capturing a sequence of images and an electronic control unit that is capable of analysing the images for the purpose of recognizing the presence of an obstacle;
  the vehicle includes means for recognizing road signage, when a stop sign or a red light is detected, the second step not being triggered when a condition for the presence of signage mandating that the vehicle come to a stop is met;
  the recognition means include a forward image capture camera on the vehicle and an electronic control unit capable of implementing an image recognition method;
  the vehicle is fitted with at least one driver assistance device that is capable of detecting the presence of a patch of fog in front of the vehicle, a condition for the presence of an obstacle in front of the vehicle being met when a patch of fog is detected;
  the motor vehicle includes at least one display means that is arranged at the rear of the vehicle.

The invention also relates to a system for displaying at least one pictogram on a motor vehicle, comprising:
  a display means comprising a display area intended to be arranged on the vehicle so as to be visible from outside the vehicle;

at least one device for detecting parameters representative of the presence of a disruption in front of the vehicle;

an electronic control unit for controlling the display means and that is connected to the detection device and to the display means in order to be able to control the display of a pictogram representative of the presence of a disruption in front of the vehicle on the basis of the parameters representative of the presence of a disruption in front of the vehicle.

According to another feature of the display system, each device for detecting parameters representative of the presence of a disruption in front of the vehicle is chosen from the following list:

a sensor for detecting the speed of the vehicle;
a sensor for detecting the actuation of a command to brake the vehicle;
a front remote detection device located at the front of the vehicle;
means for recognizing road signage;
a driver assistance device that is capable of detecting the presence of an area of reduced visibility in front of the vehicle;
a rear remote detection device located at the rear of the vehicle.

The invention also relates to a motor vehicle comprising a display system produced according to the teaching of the invention.

BRIEF DESCRIPTION OF THE FIGURES

Further features and advantages of the invention will become apparent from reading the following detailed description, for an understanding of which reference is made to the appended drawings, in which.

DETAILED DESCRIPTION OF THE FIGURES

In the rest of the description, elements having an identical structure or similar functions will be denoted by the same references.

Figure 1:
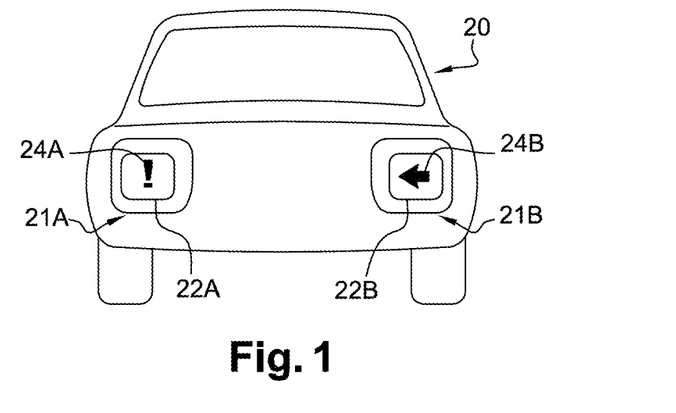
FIG. 1 is a rear view that schematically shows a vehicle fitted with two signalling devices for displaying pictograms and that are able to apply the method carried out according to the teaching of the invention.

FIG. 1 shows a vehicle with an on-board display means. This display means includes a display area visible to road users from outside the vehicle.

In the example shown in FIG. 1, the vehicle 20 is fitted with two signalling lighting devices 21A, 21B including pictogram display means 22A, 22B. Each display means 22A, 22B comprises a display area 24A, 24B arranged at the rear of the vehicle 20, substantially at the location where a rear signalling light is normally positioned. Thus, a first display means 22A is arranged on the left-hand side of the vehicle 20, whereas a second display means 22B is arranged on the right-hand side of the vehicle 20.

In one variant, the vehicle includes a single display means that is arranged at the rear of the vehicle.

The role of the display means 22A, 22B is to display pictograms in luminous form on the display area 24A, 24B. The display area 24A, 24B thus has a surface illuminated in accordance with the form of the pictogram, said illuminated surface emitting a light beam, called "pictogram beam".

According to another variant, not shown, the motor vehicle includes at least one display means that is arranged on the side and/or at the rear of the vehicle. This variant may be combined with the presence of at least one display means at the rear of the vehicle.

The pictograms may be used to contribute to a regulatory signalling function. They may also be used independently of the use of a regulatory signalling function.

The regulatory photometric characteristics of signalling lights, such as position lights, direction indicator lights, stop lights or fog lights, are well defined. They relate in particular to the minimum and maximum luminous intensity ranges to be complied with, the visibility angle of the beam, the colour of the beam, the surface area of the lighting surface of the function, or else the minimum distance between different functions.

When the display of the pictogram is used to perform a regulatory signalling function, the signalling device 21A, 21B may be produced in accordance with two embodiments.

In a first embodiment of the signalling device 21A, 21B, shown in FIG. 1, the display means 22A, 22B are configured such that the pictogram beam is able on its own to fulfil the regulatory photometric characteristics of a defined signalling function. In this embodiment, the display means is thus designed to display pictograms that are parameterized so as to emit a pictogram light beam that complies with all of the regulatory requirements of a particular signalling function.

A single pictogram may in particular fulfil a plurality of functions at the same time or alternately, such as for example an indicator light and a position light. A plurality of pictograms may also be displayed at the same time or alternately, each pictogram fulfilling the photometric characteristics of a different function of the signalling light.

Preferably and advantageously, the signalling function achieved with certain pictograms is a position light function or a combined lamp and stop light function.

Figure 2:
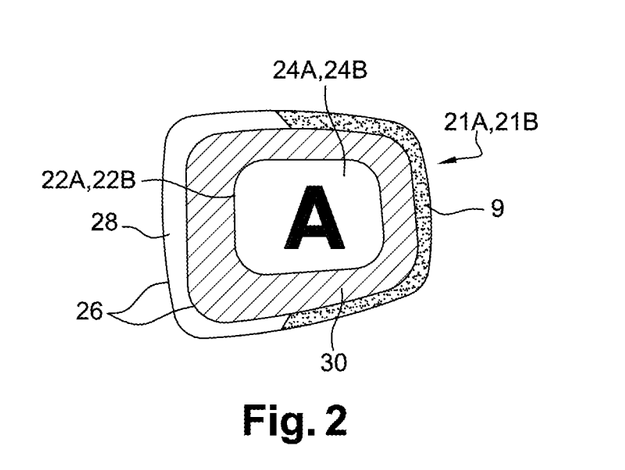
FIG. 2 is a detailed view that schematically shows a signalling device for displaying pictograms.

In a second embodiment of the signalling device 21A, 21B shown in FIG. 2, the device 21A, 21B comprises additional signalling means 26. These additional means 26 are intended to provide an additional beam that is added to the pictogram beam produced by the display means. The combination of the additional beam and the beam of the pictogram makes it possible to produce an overall light beam that achieves the regulatory photometric characteristics that are not fulfilled entirely by the beam of the pictogram on its own. The additional means 26 are fitted with at least one additional area 28, 30, in this case two of them, which are each able to transmit an additional light beam. Thus, by virtue of the additional means 26, the signalling device 21A, 21B provides an overall lighting beam that fulfils the regulatory photometric characteristics.

The additional means 26 are for example lighting devices used for normal signalling light functions and that are independent of the display means 22A, 22B. They comprise a light source able to emit light rays, for example one or more light-emitting diodes, and means for distributing the light rays onto the additional area 28, 30, the additional area 28, 30 transmitting the light rays by forming the additional beam. The distribution means may be a light guide or a reflector.

When a pictogram appears or it changes shape, the additional means 26 provide the appropriate additional beam at substantially the same time, for example so as to increase the visibility angle and/or the luminous surface area of the overall beam.

As illustrated in the embodiment of FIG. 2, the signalling device 21A, 21B may comprise a plurality of additional means 26, two of them in this case, one per function. The two additional areas 28, 30 are arranged at least partly around the display area 24A, 24B of the pictogram. An adjacent additional first area 30 surrounds the display area 24A, 24B and serves to complement the position light function—possibly in combination with a stop function. A second additional area 28 partly surrounds the first additional area 30 and serves to complement the direction indicator function (indicator light). Furthermore, a reflector 9 completes the whole of the first additional area 30.

Regardless of the embodiment chosen for the signalling device 21A, 21B, the display means is designed to display a detailed pictogram that is clearly visible to a road user, both at night and during the day. Without limitation, four exemplary embodiments of such display means 22A, 22B are described hereinafter.

According to a first embodiment of the display means 22A, 22B, not shown in the figures, each display means is a liquid-crystal, plasma or light-emitting diode screen, the display area 24A, 24B of the signalling device 21A, 21B being that of the screen.

According to a second embodiment of the display means 22A, 22B, not shown in the figures, the display means 22A, 22B comprise an areal light guide including groups of prism-type structures or cavities on one of its lateral faces. The structures are designed to return light selectively injected via one of the edges to an opposite face. There is thus a screen having areas illuminated selectively via the edges. This type of display is described for example in documents FR2994248 and US2013314944.

Figure 3:
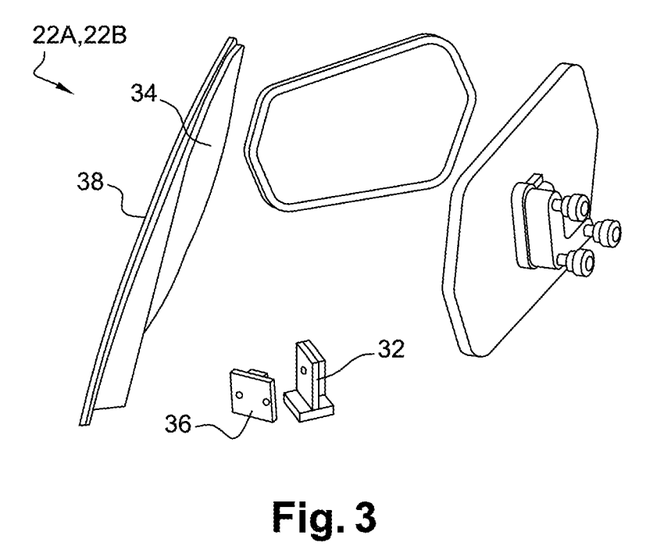
FIG. 3 is a perspective view that schematically shows one embodiment of the display means according to the invention.
Figure 4:
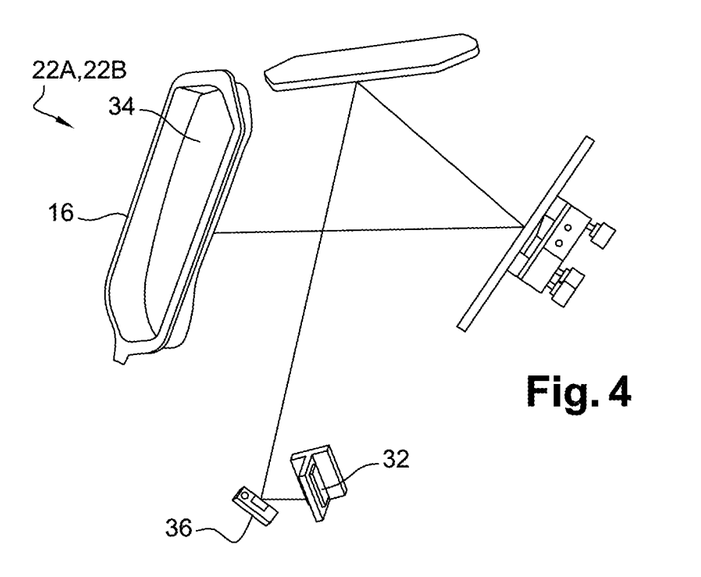
FIG. 4 is a plan view that schematically shows the display means of FIG. 3.

According to a third embodiment of the display means 22A, 22B shown in FIGS. 3 and 4, the display means 22A, 22B comprise at least one laser source 32, for example a laser diode with or without a photoluminescent element, able to form a laser beam, a transmission surface 34 defining the display area 24A, 24B, and scanning means 36 configured to scan the transmission surface 34 with the laser beam. The transmission surface 34 is for example arranged on a closing outer lens 38 of the light. The laser beam that comes from the laser source 32 is intended to illuminate the transmission surface 34.

The laser beam projects a luminous trace, in the shape of a point, onto the transmission surface 34. The scanning of the luminous trace is performed by the scanning means 36 at a speed high enough that the human eye does not see its movement over the transmission surface 34.

In this case, the scanning means 36 are a mobile micromirror that makes it possible to scan the transmission surface 34 by reflecting the laser beam. The micromirrors mentioned as scanning means are, for example, of MEMS (microelectromechanical system) type. However, the invention is in no way limited to this scanning means, and may use other types of scanning means, such as a series of mirrors arranged on a rotary element, the rotation of the element causing the transmission surface to be scanned by the laser beam.

The scanning of the laser beam by the scanning means 36 allows pictograms to appear on the transmission surface 34, the scanning means 36 being controlled by a control unit, for example.

According to a fourth embodiment of the display means, not shown, the display means comprise at least one light source formed of at least one light-emitting diode, a transmission surface defining the display area, and an array of micromirrors configured to reflect the light rays coming from the at least one light source towards the transmission surface. The transmission surface is for example arranged on the closing outer lens of the light or else is formed by a translucent screen situated behind this closing outer lens. The light beam that comes from the light source is intended to illuminate the transmission surface.

In this last embodiment, the display means comprise an array of micromirrors (also known under the acronym DMD for digital micromirror device), which directs the light rays by reflection. The light rays are reflected in two possible directions: either towards the focusing optical system or in a direction other than the focusing optical system.

Regardless of the embodiment of the display means, the latter is configured to selectively display each of the pictograms from a list of a plurality of determined pictograms, each predetermined pictogram being representative of a determined situation. FIGS. 5A to 5F show a few examples of pictograms able to be displayed alternately on the display area 24A, 24B, and two types of which are distinguished between, for example.

Generally, a pictogram is a graphical sign representative of a situation whose meaning is able to be understood quickly. The pictogram includes a stylized figurative drawing and/or alphanumeric symbols.

Figure 5A:
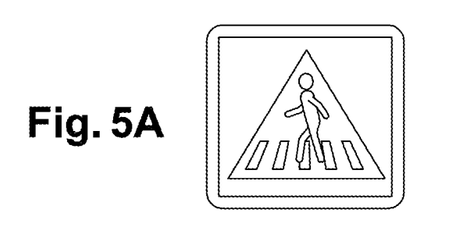
FIGS. 5A to 5F show examples of pictograms able to be displayed by the display means of the vehicle.
Figure 5B:
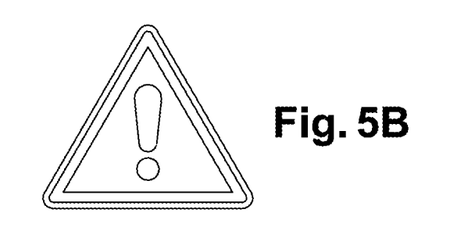
Figure 5C:
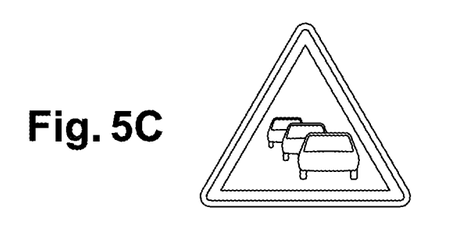
Figure 5D:
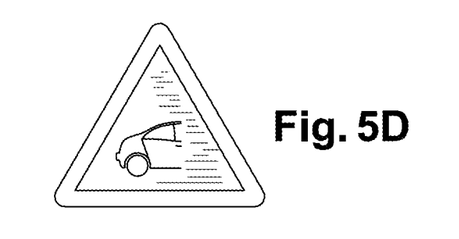
Figure 5E:
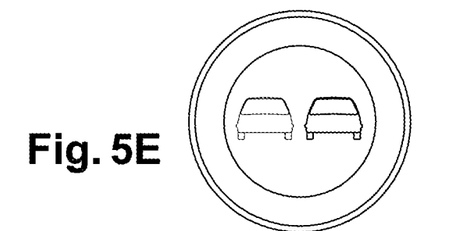

Hereinafter, the invention will relate more particularly to a method for displaying pictograms representative of a disruption in front of the vehicle. According to one nonlimiting example, these pictograms are formed by:

a pedestrian crossing in front of the vehicle as illustrated in FIG. 5A;

an exclamation mark warning of a danger as illustrated in FIG. 5B;

a plurality of vehicles representing an obstruction on the road as illustrated in FIG. 5C;

a warning about entering an area of reduced visibility as illustrated in FIG. 5D;

a ban on overtaking as illustrated in FIG. 5E.

Figure 5F:
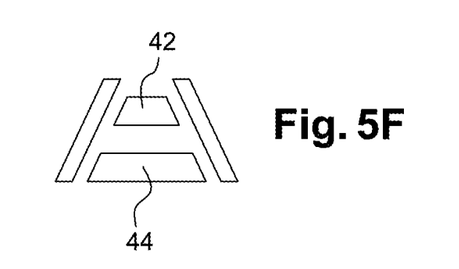

The method also relates to the display of an alert regarding the observance of the safe distance as illustrated in FIG. 5F.

The display of some pictograms may be dynamic, by modifying the size thereof, the movement thereof and the flashing thereof. For example, the pictogram warning of a pedestrian crossing illustrated in FIG. 5A, for which the pedestrian could flash or dynamically enlarge. According to another example, the pictogram relating to the safe distance illustrated in FIG. 5F for which the size and the distance between the blocks 42 and 44, which represent vehicles, could vary dynamically in real time according to the actual distance between the vehicle 20 and the following vehicle.

Figure 6:
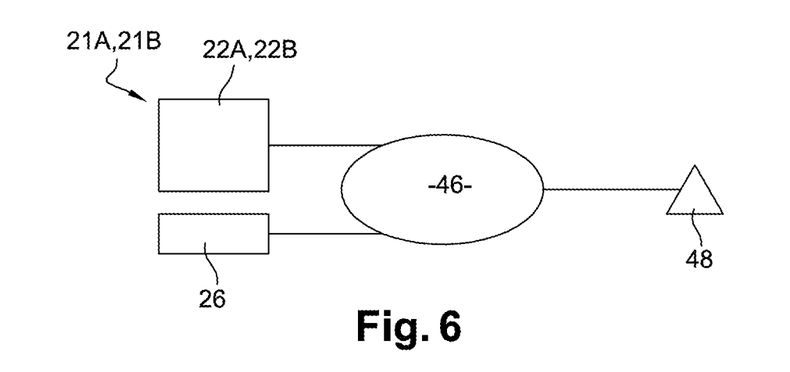
FIG. 6 is a diagram that shows one embodiment of the invention implementing an electronic control unit for controlling the display means on the basis of data supplied by sensors on board the vehicle.

One exemplary embodiment of the signalling device 21A, 21B and of the operation thereof is illustrated in FIG. 6. In addition to the display means 22A, 22B, the signalling device 21A, 21B in this case comprises an electronic control unit 46 and sensors 48 on board the vehicle 20. The sensors 48 are configured to detect or calculate certain parameters. All of these sensors 48 are linked to the electronic control unit 46 so as to provide these parameters to it.

The electronic control unit 46 is configured to automatically control the display of a pictogram representative of a determined situation on the basis of the parameters measured by the sensors 48. To this end, it develops display orders that it transmits to the display means 22A, 22B.

The electronic control unit 46 includes for example a memory in which a list of predetermined pictograms is stored. The electronic control unit 46 selects the pictogram to be displayed from the pictogram list on the basis of the situation. It may also dynamically change the drawing of the pictogram on the basis of these parameters.

In the corresponding embodiment, the electronic control unit 46 also sends commands to the additional means 26 so as to coordinate them with the display means 22A, 22B for displaying the pictogram. Thus, the pictogram beam and the additional beam are coordinated so as to fulfil the regulatory photometric characteristics.

In the case of a pair of signalling devices 21A, 21B, each display means 22A, 22B is able to be controlled independently of one another by the electronic control unit 46.

According to the teachings of the invention, the display means 22A, 22B described above are used to warn following drivers of the presence of a disruption in front of the vehicle by automatically displaying a pictogram representative of said disruption. This display thus allows a following driver to slow down and not to initiate a dangerous overtaking procedure.

Figure 7:
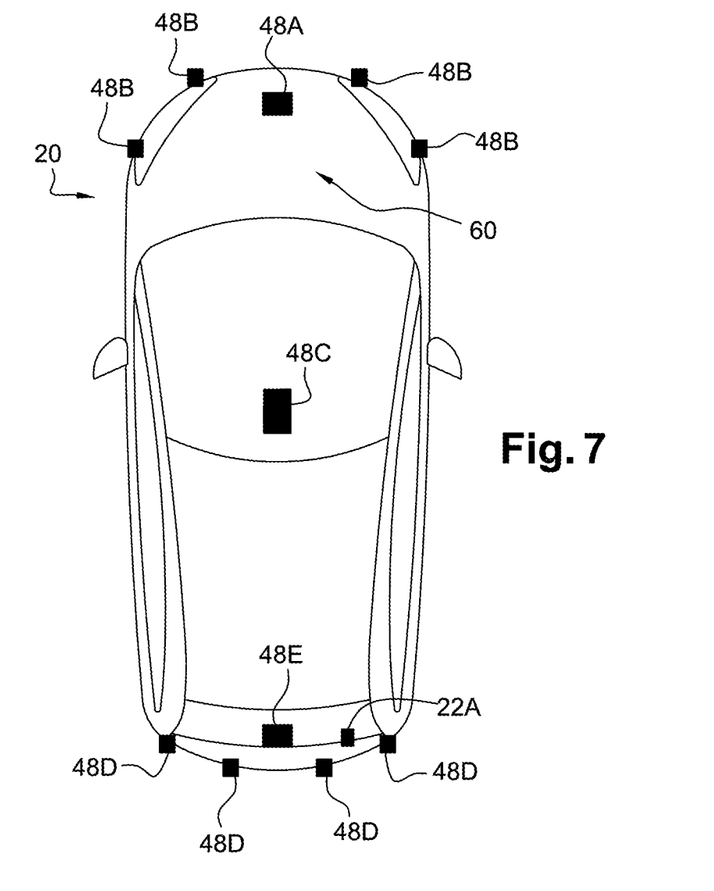
FIG. 7 is a plan view that schematically shows a motor vehicle fitted with remote detection devices that are intended to measure parameters representative of the presence of a disruption in front of the vehicle and of the presence of a following vehicle behind the vehicle.

FIG. 7 shows a schematic plan view of the vehicle 20.

The vehicle 20 is fitted with at least one remote detection device 48 that is capable of detecting the presence of an obstacle in front of or behind the vehicle 20. The vehicle 20 is for example fitted with at least one of the front remote detection devices described below.

Such a remote detection device 48 makes it possible in particular to measure the distance between the detected obstacle and said remote detection device 48. Generally, the distance measurements are performed at high frequency as to make it possible to track substantially continuously the variation in the distance between the vehicle 20 and the obstacle.

A first front remote detection device 48A includes at least one emitter of an electromagnetic signal oriented towards the front of the vehicle 20 and an associated sensor for receiving said electromagnetic signal after reflection off an obstacle located in front of the vehicle 20. Such a front remote detection device 48A is for example formed by a lidar or a radar.

A second front remote detection device 48B includes at least one emitter of a sound signal towards the front of the vehicle 20, in particular ultrasound, and an associated sensor for receiving said sound signal after reflection off an obstacle. The vehicle 20 is here fitted with four front remote detection devices 48B, which are distributed transversely at the front of the vehicle 20. This thus makes it possible accurately to determine the position of the obstacle with respect to the vehicle 20.

As a variant, the second front remote detection device is formed by at least one proximity sensor.

A third front remote detection device 48C includes a camera that is suitable for capturing a sequence of images of the road in front of the vehicle 20 and an electronic control unit that is capable of analysing the images for the purpose of recognizing the presence of an obstacle.

Some of these detection devices furthermore make it possible to detect whether the obstacle is moving transversely with respect to the longitudinal direction of movement of the vehicle 20 is detected in front of the vehicle 20.

This is particularly the case of the set of second front remote detection devices 48B, which are distributed at the front of the vehicle 20. The combined measurements from these four front remote detection devices 48B allow the electronic control unit 46 to determine that an obstacle is moving and the direction of movement of this obstacle.

This is also the case of the third front remote detection device 48C, which allows a chronological sequence of images to be transmitted to the electronic control unit 46. The analysis of the position of the obstacle in these various images makes it possible to work out its direction of movement.

The vehicle 20 is also fitted with at least one remote detection device that is capable of detecting the presence of a road user behind the vehicle 20. Rear remote detection devices 48D are here devices that are similar to the second devices 48B described above. Another rear remote detection device 48E is here a device that is similar to the third device 48C described above. Of course, these devices are here arranged to detect an obstacle located behind the vehicle 20.

The vehicle 20 is also fitted with a driver assistance device (not shown), which is capable of detecting the presence of an area of reduced visibility in front of the vehicle 20, such as a patch of fog. Such a device uses for example the front remote detection devices 48A to 48C described above to detect the presence of an area of reduced visibility. One example of such a device and its operation are described in detail in the document EP-A-2.743.130.

The vehicle 20 illustrated in FIG. 7 thus incorporates a display system 60 produced according to the teaching of the invention. The display system 60 thus comprises:
- a display means 22A, 22B comprising a display area 24A, 24B intended to be arranged on the vehicle 20 so as to be visible from outside the vehicle;
- at least one device for detecting parameters representative of the presence of a disruption in front of the vehicle 20;
- an electronic control unit for controlling the display means 22A, 22B and that is connected to the detection device and to the display means 22A, 22B in order to be able to control the display of a pictogram representative of the presence of a disruption in front of the vehicle 20 on the basis of the parameters representative of the presence of a disruption in front of the vehicle 20.

The one or more devices for detecting parameters representative of the presence of a disruption in front of the vehicle 20 are chosen from the following list:
- a sensor for detecting the speed of the vehicle 20;
- a sensor for detecting the actuation of a command to brake the vehicle 20;
- a front remote detection device 48 located at the front of the vehicle 20;
- means for recognizing road signage;
- a driver assistance device that is capable of detecting the presence of an area of reduced visibility in front of the vehicle 20;
- a rear remote detection device 48D, 48E located at the rear of the vehicle 20.

Figure 8:
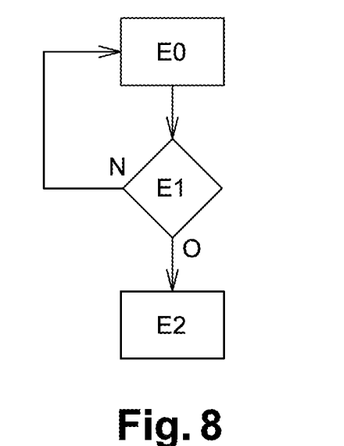
FIG. 8 is a block diagram that illustrates the steps of the method carried out according to the teaching of the invention.

With reference to the block diagram of FIG. 8, the method includes a first step "E1" of determining a disruption in front of the vehicle 20, in which the electronic control unit 46 checks that one or more parameters representative of a disruption in front of the vehicle 20 meet predetermined conditions. The parameters are measured by appropriate sensors 48 in a prior step "E0".

When the predetermined conditions are met, a second step "E2" of developing a display order is automatically triggered. In this second step "E2", the electronic control unit 46 transmits an order to display a pictogram representative of said disruption on at least one display means 22A, 22B.

Provision is made for the pictogram representative of the disruption in front of the vehicle 20 to remain displayed on the display means in question for a predetermined duration.

According to a first embodiment of the invention, the disruption determined in the first step is the presence of a road user crossing the road in front of the vehicle 20. When such a disruption is detected, the electronic control unit 46 transmits an order to display a pictogram such as that shown in FIG. 5A, which shows a pedestrian crossing the road.

As a variant, the electronic control unit 46 transmits an order to display an alert pictogram such as that shown in FIG. 5B.

One condition to be met in the first step "E1" in order to be able to trigger the second step "E2" relates to the state of movement of the vehicle 20.

Thus, a first parameter representative of the presence of a disruption in front of the vehicle 20 is formed by the speed of the vehicle 20. The speed parameter of the vehicle 20 is measured by a speed sensor (not shown) of the vehicle 20. This is for example a speed sensor conventionally used to indicate the current speed of the vehicle 20 to the driver through a display on the dashboard.

The associated speed condition "C1" to be met in the first step "E1" being that the driving speed of the vehicle 20 be below a predetermined threshold. The speed threshold is very low, for example lower than 20 km/h.

As a variant, the speed condition "C1" is met when the speed of the vehicle 20 is zero. In this case, the predetermined speed threshold is set to zero.

A second parameter representative of the presence of a disruption in front of the vehicle 20 is formed by the actuation state of a command to brake the vehicle 20. The associated braking condition "C2" to be met in the first step "E1" is that the brake command be actuated beyond a predetermined degree. To this end, the vehicle includes a sensor for detecting the actuation of a brake command. This is for example a sensor that detects the degree of depression of a brake pedal controlling the braking device of the vehicle 20. Specifically, it is considered that the first reflex of a driver becoming aware of a pedestrian about to cross the road is to hit the brake.

The speed condition "C1" and/or the braking condition "C2" are however not enough to characterize a situation of a moving obstacle, such as a pedestrian, crossing the road. At least one of these conditions "C1", "C2" relating to the state of movement of the vehicle 20 must be added together with at least one condition for the presence of an obstacle in front of the vehicle 20.

A third parameter representing the presence of a disruption in front of the vehicle 20 is formed by the detection of an obstacle in front of the vehicle 20 by at least one of the front remote detection devices 48 located at the front of the vehicle 20. One condition "C3" for the presence of an obstacle is that a road user be detected as appearing in the path of the vehicle 20 at a distance that is below a predetermined value in front of the vehicle 20, for example below 10 m. The term "appearing" means that the obstacle has not been detected at a distance that is greater than said determined value.

Thus, this condition "C3" makes it possible to distinguish a road user crossing the road from an obstruction on the road. In the case of an obstruction on the road, stopped vehicles are in fact detected at a large distance by the front remote detection devices 48, the distance between the obstruction and the vehicle 20 decreasing gradually. Conversely, a road user crossing the road appears in the path of the vehicle 20 at a relatively short distance, since said road user is not in the path of the vehicle 20 before starting to cross.

A fourth parameter representing the presence of a disruption in front of the vehicle 20 is formed by detecting an obstacle moving transversely with respect to the longitudinal direction of movement of the vehicle 20. This parameter is detected by at least one of the front remote detection devices 48B, 48C fitted to the front of the vehicle 20. A second condition "O4" for the presence of an obstacle is that the obstacle detected in front of the vehicle 20 be moving transversely.

The combination of at least one of the conditions "C1", "C2" for the state of movement of the vehicle 20 and at least one of the conditions "C3", "C4" for the presence of an obstacle in front of the vehicle 20 makes it possible to detect a situation of a road user such as a pedestrian, an animal, a bicycle or another motor vehicle crossing the road. Such a combination allows following drivers to be warned effectively as to why the vehicle 20 has stopped or slowed down.

According to one variant of this first embodiment, alongside the conditions "C1", "C2" for the state of movement of the vehicle 20 and the conditions "C3", "C4" for the presence of an obstacle in front of the vehicle 20, poka-yoke conditions are added so that the pictogram is not displayed when the vehicle 20 is stopped because of the presence of mandatory stop signals such as a stop sign or a red light.

To this end, the vehicle 20 includes means for recognizing road signage. This is for example the camera 48C that transmits an image of the road in front of the vehicle 20 to the electronic control unit 46. The latter is capable of analysing the image in order to recognize the presence of a stop sign or of a red light.

As a variant, the vehicle 20 is fitted with a sensor that is able to receive a signal emitted by a red light emitting a signal representative of a ban on overtaking.

When a stop sign or a red light is detected in the first step "E1", the second step "E2" is not triggered. Thus, the pictogram is not displayed when a pedestrian crosses the road while the vehicle 20 is stopped at a red light or at a stop sign. Specifically, since such road signs are visible for following drivers, it is not necessary to signal the presence of pedestrians.

According to a second embodiment of the invention, the disruption determined in the first step is the presence of an obstruction on the road in front of the vehicle 20. When such a disruption is detected, the electronic control unit 46 transmits an order to display a pictogram such as that shown in FIG. 5C, which shows a plurality of vehicles queuing.

As a variant, the electronic control unit 46 transmits an order to display an alert pictogram such as that shown in FIG. 5B.

One condition to be met in the first step "E1" in order to be able to trigger the second step "E2" relates to the state of movement of the vehicle 20.

Thus, a first parameter representative of the presence of a disruption in front of the vehicle 20 is formed by the speed of the vehicle 20. The speed parameter of the vehicle 20 is measured by a speed sensor (not shown) of the vehicle 20. This is for example a speed sensor conventionally used to indicate the current speed of the vehicle 20 to the driver through a display on the dashboard.

The associated speed condition "C1" to be met in the first step "E1" is that the driving speed of the vehicle 20 be below a predetermined threshold.

A second parameter representative of the presence of a disruption in front of the vehicle 20 is formed by the actuation state of a command to brake the vehicle 20. The associated braking condition "C2" to be met in the first step "E1" is that the brake command be actuated beyond a predetermined degree. This is for example the degree of depression of a brake pedal controlling the braking device of the vehicle 20. Specifically, it is considered that the first reflex of a driver becoming aware of an obstruction on the road, such as a traffic jam or a holdup, is to hit the brake.

As a variant, the braking condition "C2" is combined with a supplementary initial speed condition "C2*bis*" that is met when the initial speed of the vehicle 20, just before the braking condition "C2" is met, is higher than a determined threshold, for example 90 km/h. Thus, following drivers are warned only when the vehicle 20 is driving on a high-speed road such as a motorway. Indeed, obstructions on the road are particularly dangerous on this type of road.

The speed condition "C1" and/or the braking condition "C2" are however not enough to characterize a situation of an obstruction on the road. At least one of these conditions "C1", "C2" relating to the state of movement of the vehicle 20 must be added together with at least one condition for the presence of an obstacle in front of the vehicle 20.

A third parameter representing the presence of a disruption in front of the vehicle 20 is formed by the detection of an obstacle in front of the vehicle 20 by at least one of the front remote detection devices 48 located at the front of the vehicle 20. One condition "C3" for the presence of an obstacle is that an obstacle be detected in the path of the vehicle 20 at a distance that is greater than a predetermined distance, for example greater than 200 m, and that the separation from the obstacle decreases to a predetermined value in front of the vehicle 20, for example less than 50 m.

As a variant, the condition for the presence of an obstacle is met when the distance between the vehicle 20 and an obstacle detected in front decreases at a speed that is greater than a determined speed threshold.

According to one variant of this first embodiment, alongside the conditions "C1", "C2" for the state of movement of the vehicle 20 and the condition "C3" for the presence of an obstacle in front of the vehicle 20, poka-yoke conditions are added so that the pictogram is not displayed when the vehicle 20 is stopped because of the presence of mandatory stop signals.

To this end, the vehicle 20 includes means for recognizing road signage. This is for example the camera 48C that transmits an image of the road in front of the vehicle 20 to the electronic control unit 46, which is capable of analysing the image in order to recognize the presence of a stop sign, of a red light, of an approaching toll booth, etc.

When a stop sign or a red light is detected in the first step "E1", the second step "E2" is not triggered.

According to a third embodiment of the invention, the disruption determined in the first step is the presence of an area of reduced visibility in front of the vehicle 20. When such a disruption is detected, the electronic control unit 46 transmits an order to display a pictogram such as that shown in FIG. 5D.

As a variant, the electronic control unit 46 transmits an order to display an alert pictogram such as that shown in FIG. 5B.

One condition "C4" to be met in the first step "E1" in order to be able to trigger the second step "E2" is the detection of an area of reduced visibility by the driver assistance device such as that described in the document EP-A-2.743.130.

Optionally, an associated brake condition "C2" to be met in the first step "E1" is added in combination. The brake condition "C2" is met when the brake command is actuated beyond a predetermined degree. This is for example the degree of depression of a brake pedal controlling the braking device of the vehicle 20. Specifically, it is considered that the first reflex of a driver becoming aware of an area of reduced visibility is to hit the brake.

As a variant, the braking condition "C2" is combined with a supplementary initial speed condition "C2*bis*" that is met when the initial speed of the vehicle 20, just before the braking condition "C2" is met, is higher than a determined threshold, for example 90 km/h. Thus, following drivers are warned only when the vehicle 20 is driving on a high-speed road such as a motorway. Indeed, areas of reduced visibility are particularly dangerous on this type of road.

According to a fourth embodiment of the invention, the disruption determined in the first step is the presence of another vehicle in an adjacent overtaking lane in front of the vehicle 20. When such a disruption is detected, the electronic control unit 46 transmits an order to display a pictogram such as that shown in FIG. 5E, representing a ban on overtaking.

As a variant, the electronic control unit 46 transmits an order to display an alert pictogram such as that shown in FIG. 5B.

One condition to be met in the first step "E1" in order to be able to trigger the second step "E2" relates to the presence of a following vehicle on the road behind the vehicle 20.

Thus, a first parameter representative of the presence of a road user behind the vehicle 20 is formed by the distance between the vehicle 20 and a following vehicle. This parameter is measured by the rear remote detection devices 48D, 48E. The associated condition is that the following vehicle be at a distance that is below a predetermined distance, for example 10 m.

As a variant, a condition for the speed of approach of the following vehicle, which is met when the distance between the vehicle 20 and the following vehicle decreases at a speed that is greater than a determined speed, is added.

A second parameter is the presence of an obstacle in front and in an adjacent lane with respect to the vehicle 20. This parameter is detected by the front remote detection devices 48 of the vehicle 20.

One condition to be met is that an obstacle be detected in an adjacent overtaking lane.

A second condition to be met is that the distance between the obstacle and the vehicle 20 decrease at a speed that is greater than a determined speed.

Thus, when a following vehicle approaches from behind at a relatively high speed, the probability that this following vehicle wishes to overtake the vehicle 20 is quite high. When another vehicle occupying the adjacent overtaking lane is detected in addition, displaying the pictogram makes it possible to warn the following vehicle that overtaking is not possible.

The method carried out according to the teaching of the invention thus makes it possible to warn road users of the presence of a disruption in front of the vehicle 20. This allows road users following the vehicle 20 implementing the method according to the invention to anticipate a sudden braking of the vehicle 20 or the impossibility of overtaking.

The method applied to the signalling device 21A, 21B described above makes it possible to display a pictogram that complies with the regulatory obligations in respect of signalling lights. Thus, when the stop lights or the position lights of the vehicle 20 are turned on, the pictogram contributes to, or even completely produces, said regulatory function.

As a variant, in the first step "E1" of the method carried out according to any one of the preceding embodiments, it includes a supplementary condition for the detection of the presence of a following vehicle behind the vehicle 20. This makes it possible to trigger the second step "E2" only when a following vehicle is present. This avoids displaying a pictogram when no following vehicle is present.

When the motor vehicle includes at least one display means that is arranged on the side of the vehicle in addition to the display means arranged at the rear, the display means are controlled at the same time so as to warn third parties who are already level with the vehicle of the presence of a disruption in front of the vehicle 20.

The invention claimed is:

1. A method for controlling a display of a motor vehicle, the method comprising:
checking whether at least one parameter representative of a presence of a disruption in front of the motor vehicle meets at least one predetermined condition;
determining the presence of the disruption in front of the motor vehicle based on the checking;
selecting, based on the determination of the presence of the disruption at least one pictogram from a list of a plurality of pictograms, each pictogram representing a situation of the motor vehicle; and
displaying the at least one pictogram representing the situation of the motor vehicle on a display area visible from outside the motor vehicle such that other motor vehicles following behind the motor vehicle are warned that overtaking the motor vehicle is not possible.

2. The method according to claim 1, wherein a first parameter representative of the presence of the disruption in front of the motor vehicle is formed by a driving speed of the motor vehicle, the at least one predetermined condition is met when the driving speed of the motor vehicle is below a predetermined threshold.

3. The method according to claim 2, wherein a second parameter representative of the presence of the disruption in front of the motor vehicle is formed by an actuation state of a brake command to brake the motor vehicle, the at least one predetermined condition is met when the brake command is actuated beyond a predetermined degree.

4. The method according to claim 2, wherein the motor vehicle is fitted with at least one remote detection device that detects a presence of an obstacle in front of the motor vehicle, a second condition for a presence of a road user being that the obstacle appears in front of the motor vehicle at a distance that is below a predetermined distance.

5. The method according to claim 1, wherein a second parameter representative of the presence of the disruption in front of the motor vehicle is formed by an actuation state of a brake command to brake the motor vehicle, the at least one predetermined condition is met when the brake command is actuated beyond a predetermined degree.

6. The method according to claim 1, wherein the motor vehicle is fitted with at least one remote detection device that detects a presence of an obstacle in front of the motor vehicle, a second condition for a presence of a road user being that the obstacle appears in front of the motor vehicle at a distance that is below a predetermined distance.

7. The method according to claim 6, wherein the at least one remote detection device includes at least one emitter of an electromagnetic signal and an associated sensor for receiving the electromagnetic signal after reflection off an obstacle located in front of the motor vehicle.

8. The method according to claim 6, wherein the at least one remote detection device includes at least one emitter of a sound signal, and an associated sensor for receiving the sound signal after reflection off an obstacle.

9. The method according to claim 6, wherein the at least one remote detection device is formed by at least one proximity sensor.

10. The method according to claim 6, wherein the at least one remote detection device includes a camera that is suitable for capturing a sequence of images and an electronic control circuit that analyzes the images for recognizing a presence of an obstacle.

11. The method according to claim 1, wherein the motor vehicle is fitted with at least one remote detection device that detects a presence of a moving obstacle in front of the motor vehicle, a third condition being that the moving obstacle moving transversely with respect to a longitudinal direction of a movement of the motor vehicle is detected in front of the motor vehicle.

12. The method according to claim 1, wherein a parameter representative of the presence of the disruption in front of the motor vehicle is formed by a detection of an obstacle in front of the motor vehicle by at least one front remote detection device, a condition for a presence of the obstacle is that the obstacle is detected in a path of the motor vehicle at a distance that is greater than a predetermined distance, and that a separation from the obstacle decreases below a predetermined value in front of the motor vehicle.

13. The method according to claim 1, wherein the motor vehicle is fitted with at least one remote detection device that detects a presence of a road user behind the motor vehicle, a condition for displaying the at least one pictogram being that a following motor vehicle is detected at a distance that is below a predetermined value behind the motor vehicle.

14. The method according to claim 1, wherein the motor vehicle includes circuitry for recognizing road signage, when a stop sign or a red light is detected, the displaying is not triggered when a condition for a presence of signage mandating that the motor vehicle comes to a stop is met.

15. The method according to claim 14, wherein the circuitry include a forward image sensor on the motor vehicle and an electronic control circuit implementing an image recognition method.

16. The method according to claim 1, wherein the motor vehicle is fitted with at least one driver assistance device that detects a presence of a patch of fog in front of the motor vehicle, a condition for a presence of an obstacle in front of the motor vehicle being met when the patch of fog is detected.

17. The method according to claim 1, wherein the motor vehicle includes at least one display that is arranged at a rear of the motor vehicle.

18. A system for displaying at least one pictogram on a motor vehicle, the system comprising:
a display including a display area visible from outside the motor vehicle;

at least one detection device for checking whether at least one parameter representative of a presence of a disruption in front of the motor vehicle meets at least one predetermined condition, and for determining the presence of the disruption in front of the motor vehicle based on the checking; and an electronic control circuit for selecting, based on the determination of the presence of the disruption, at least one pictogram from a list of a plurality of pictograms, each pictogram representing a situation of the motor vehicle, and for displaying the at least one pictogram representing the situation of the motor vehicle on the display area visible from the outside the motor vehicle such that other motor vehicles following behind the motor vehicle are warned that overtaking the motor vehicle is not possible.

19. The system according to claim 18, wherein the at least one detection device for detecting the at least one parameter representative of the presence of the disruption in front of the motor vehicle is one of:

a first sensor for detecting a speed of the motor vehicle;

a second sensor for detecting an actuation of a command to brake the motor vehicle;

a front remote detection device located at the front of the motor vehicle;

a third sensor for recognizing road signage;

a driver assistance device that detects a presence of an area of reduced visibility in front of the motor vehicle; and a rear remote detection device located at a rear of the motor vehicle.

20. A motor vehicle comprising the according to claim 18.

* * * * *